United States Patent
Rosenberg et al.

(10) Patent No.: US 8,954,476 B2
(45) Date of Patent: Feb. 10, 2015

(54) SYSTEM AND METHOD FOR MEDIATING TRANSACTIONS OF DIGITAL DOCUMENTS

(75) Inventors: Alon Rosenberg, Ra'anana (IL); Ronen Brafman, Ramot Meir (IL); Eyal Rosenberg, Kfar Saba (IL)

(73) Assignee: Nipendo Ltd., Netanya (IL)

( * ) Notice: Subject to any disclaimer, the term of this patent is extended or adjusted under 35 U.S.C. 154(b) by 1852 days.

(21) Appl. No.: 11/882,784

(22) Filed: Aug. 6, 2007

(65) Prior Publication Data

US 2009/0043794 A1 Feb. 12, 2009

(51) Int. Cl.
 G06F 7/00 (2006.01)
 G06F 17/30 (2006.01)
 G06Q 10/00 (2012.01)

(52) U.S. Cl.
 CPC ..................................... *G06Q 10/00* (2013.01)
 USPC ......................................... 707/803; 707/804

(58) Field of Classification Search
 USPC ........ 707/100–102, 104.1; 715/236, 239, 249
 See application file for complete search history.

(56) References Cited

U.S. PATENT DOCUMENTS

| | | | |
|---|---|---|---|
| 5,666,490 A | 9/1997 | Gillings et al. | |
| 5,832,100 A | 11/1998 | Lawton et al. | |
| 6,012,083 A | 1/2000 | Savitzky et al. | |
| 6,397,231 B1 | 5/2002 | Salisbury et al. | |
| 6,643,652 B2 | 11/2003 | Helgeson et al. | |
| 6,725,426 B1 | 4/2004 | Pavlov | |
| 6,826,597 B1 | 11/2004 | Lonnroth et al. | |
| 6,986,104 B2 | 1/2006 | Green et al. | |
| 7,072,061 B2 | 7/2006 | Blair et al. | |
| 7,472,083 B2 | 12/2008 | Schleicher | |
| 7,584,422 B2 | 9/2009 | Ben-Yehuda et al. | |
| 2002/0049603 A1 | 4/2002 | Mehra et al. | |
| 2002/0099735 A1* | 7/2002 | Schroeder et al. | 707/513 |
| 2002/0129006 A1 | 9/2002 | Emmett et al. | |
| 2002/0165717 A1 | 11/2002 | Solmer et al. | |
| 2003/0140048 A1 | 7/2003 | Meier et al. | |
| 2004/0024662 A1 | 2/2004 | Gray et al. | |
| 2004/0088233 A1 | 5/2004 | Brady et al. | |
| 2004/0194009 A1 | 9/2004 | LaComb et al. | |
| 2005/0022154 A1 | 1/2005 | Chung et al. | |
| 2005/0180574 A1 | 8/2005 | Ritz et al. | |
| 2005/0273365 A1 | 12/2005 | Baumgartner et al. | |
| 2006/0236215 A1 | 10/2006 | Wu et al. | |
| 2006/0251029 A1* | 11/2006 | Fritsch et al. | 370/338 |
| 2007/0011134 A1 | 1/2007 | Langseth et al. | |
| 2007/0121147 A1 | 5/2007 | Corona et al. | |
| 2008/0005144 A1 | 1/2008 | Katz et al. | |
| 2008/0215354 A1 | 9/2008 | Halverson et al. | |
| 2008/0250157 A1 | 10/2008 | Ohata | |
| 2008/0278740 A1 | 11/2008 | Bird et al. | |
| 2009/0089696 A1 | 4/2009 | Miller et al. | |
| 2009/0092318 A1 | 4/2009 | Berard et al. | |

* cited by examiner

*Primary Examiner* — Hares Jami
(74) *Attorney, Agent, or Firm* — Pearl Cohen Zedek Latzer Baratz LLP

(57) ABSTRACT

A system and method for mediating a transaction of a digital document by converting a transaction into an internal representation according to predefined rules and according to processing definitions associated with the source of the transaction, validating and possibly altering the transaction in its internal representation according to predefined rules and according to processing definitions associated with the destination of the transaction, converting said internal representation into an external representation according to predefined rules and according to rules specific to a destination of said transaction and communicating the external representation to a destination.

2 Claims, 3 Drawing Sheets

SYSTEM AND METHOD FOR MEDIATING TRANSACTIONS OF DIGITAL DOCUMENTS

BACKGROUND OF THE INVENTION

With advancements in computing and communication technologies, business to business (B2B) correspondence has evolved dramatically. B2B documents such as invoices, shipping notes or purchase orders may be communicated as digital documents. Such communication enables correspondence methods that were impossible in the past. Businesses may correspond with numerous organizations, institutes or other businesses by exchanging digital documents. However, in many cases, a recipient of a digital document may specify various criteria a received document must comply with. Parameters and attributes pertaining to the format, organization and content of a document may be defined by a recipient as well as possibly the protocol by which a digital document is to be communicated.

Organizations that need to exchange electronic documents may do so in a variety of ways, for example, by electronic mail, file transfer, or by exchanging removable storage media such as compact disk (CD) or Universal Serial Bus (USB) disk drives. However, such means of communications may entail human inspection of the content received in order to verify validity of a transaction. B2B documents may contain numerous details, such as parts catalog numbers, currency exchange rates, or form identification numbers. Some details, for example, those mentioned above, may be represented differently by different business organizations. For example, different organizations may have different catalog numbers for the same item. Furthermore, transactions may need to be recorded within an organization's database or other storage system, in which case, recording information received for example, by electronic mail, may need to done manually.

SUMMARY OF EMBODIMENTS OF THE INVENTION

Embodiments of the invention may be used to control, automate or otherwise supervise tasks associated with handling of business to business correspondence. For example, converting a document from one format to another, validating the content of a document, and/or validating data types in a document. According to some embodiments of the invention, a central hub may connect or otherwise transmit information between and amongst business parties or other organizations. Transactions between organizations may be directed to the central hub, where validation of data may be performed, as well as various modifications and/or transformations that may be applied to the content, format or other aspects of the transaction or transaction document.

According to some embodiments of the invention, parties communicating via the central hub may define rules and/or criteria for the validation process, for example, the format and content of received documents may be defined by a recipient. Parties may further define rules by which invalid transactions may be automatically corrected by the system or rejected and returned to their sender. According to some embodiments of the invention, various aspects pertaining to transactions may be further defined, for example, the protocol to be used for communicating transactions, time constraints and/or priorities for various processes.

According to some embodiments of the invention, modifications applied to a transaction may comprise incorporating data retrieved from external sources into the content of a received transaction. For example, web services may be used to retrieve data over a network from a remote server, or a database may be queried in order to retrieve data required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
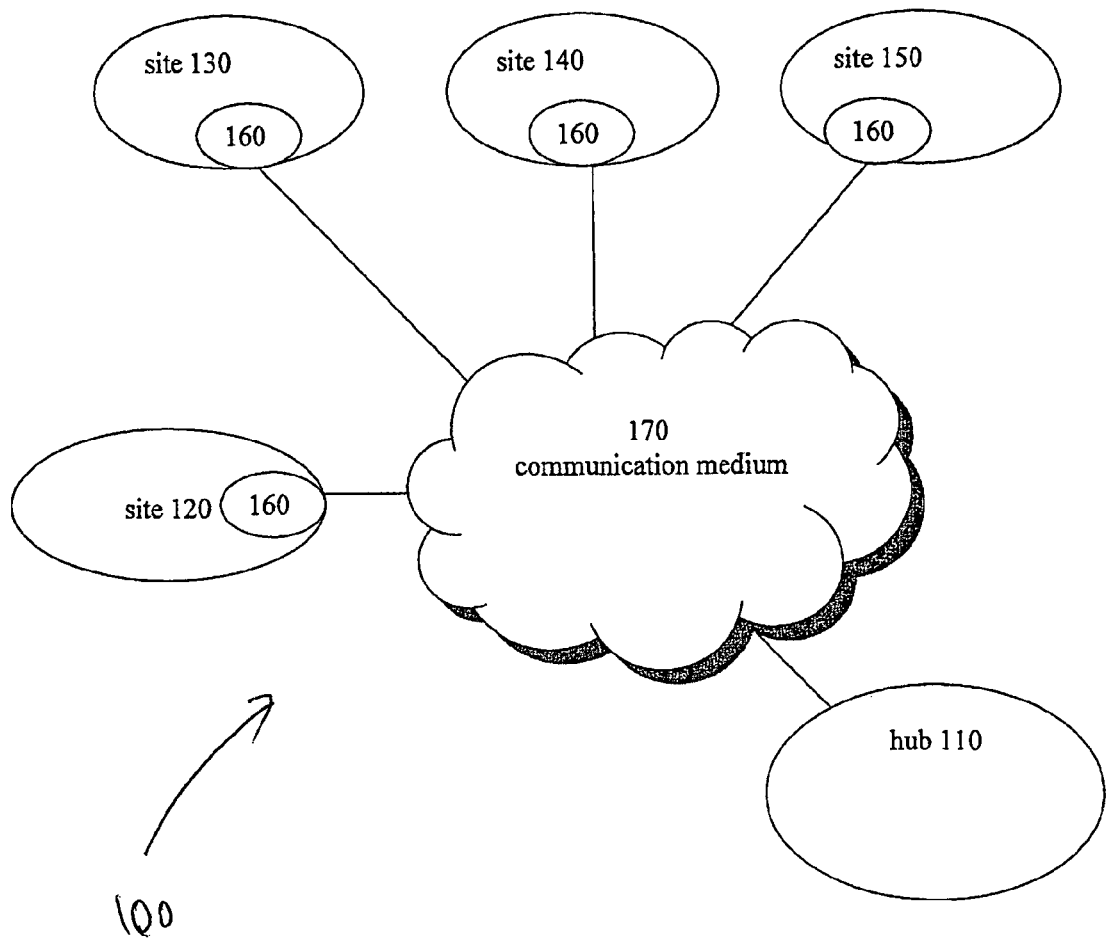
FIG. 1 shows an exemplary system according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Furthermore, the application makes reference to a business document or to an electronic document; however, it will be recognized that the technological teachings of the present invention may be applied to any context in which a formal document associated with or based upon an enterprise resource planning (ERP) system may be desired to be transmitted to a correspondent, for example, between government agencies, or from a government agency to its clients or constituents, etc. Accordingly, some applications of the present invention may include invoices, bills, purchase orders, shipping notes, payment receipts, official actions, etc.

Unless explicitly stated, the method embodiments described herein are not constrained to a particular order or sequence. Additionally, some of the described method embodiments or elements thereof can occur or be performed at the same point in time.

Reference is now made to FIG. 1 showing an exemplary system incorporating some embodiments of the invention. System 100 shows exemplary sites 120, 130, 140 and 150 and hub 110. Sites 120, 130, 140 and 150 may exchange digital documents, for example, these documents may be business to business (B2B) documents. In other embodiments of the invention, site 120 may be a corporate head office or government agency and sites 130, 140 and 150 may be branch offices associated with that head office or agency. In some cases, site 120 may be a supplier and sites 130, 140 and 150 may be customers, or site 120 may be a customer and sites 130, 140 and 150 may be suppliers. It will be understood that sites may be a sender and a recipient of electronic documents in different transactions, depending on the context and the correspondent.

Accordingly, transactions between the sites may comprise various forms related to the functions of site 120. According to some embodiments of the invention, sites 120, 130, 140 and 150 may communicate through hub 110 over communication medium 170. For example, a transmitting site 120 may communicate a transaction destined for recipient site 150 to hub 110. Hub 110 may process the transaction document received from transmitting site 120, possibly converting, or altering some of the content received, as well as possibly adding information to the content received, and may further communicate the resultant information to recipient site 150. As described further below, rules for processing the transaction document may be performed based on rules set by transmitting site 120, recipient site 150.

According to some embodiments of the invention, communication medium 170 may be a facility such as, but not limited to, private IP network, the Internet, integrated services digital network (ISDN) line, a frame relay connection, a modem connected to a phone line or any other suitable communication means.

According to some embodiments of the invention, a software module 160 may be installed in each site communicating through hub 110. According to some embodiments of the invention, module 160 may communicate with hub 110. Module 160 may be provided with configuration parameters by an operator, which may be stored in a configuration file. Module 160 may retrieve configuration parameters from such configuration file when required. For example, an identification code may be provided to module 160 by an operator. Hub 110 may require module 160 to provide an identification code in order for transactions to take place or for transaction documents to be received and processed. According to some embodiments of the invention, hub 110 may upload software module 160 to a site. Hub 110 may further upgrade module 160 from time to time, for example, when new features that require an upgrade of module 160 are introduced.

According to some embodiments of the invention, hub 110 may establish a communication session with module 160. This session may further be used for communicating transactions. Transactions performed by system 100 may contain sensitive, possibly secret information. Accordingly, in some embodiments of the invention, the communication session established between hub 110 and module 160 may be a secured connection. Accordingly, module 160 may be provided with information required in order to establish and/or maintain a secured connection. For example, secured socket layer (SSL) may be used. In such case, module 160 may be provided with required parameters for establishing an SSL connection, e.g. SSL certificates. In some embodiments of the invention, a unique identification key may be provided to each site communicating through hub 110. Hub 110 may prohibit communication with sites that fail to provide an expected identification key.

According to some embodiments of the invention, hub 110 may continuously verify that a communication session with module 160 exists. For example, hub 110 may periodically send a predefined message to module 160 and further expect a predefined message as a reply from module 160. Accordingly, module 160 may be configured to respond to such message with a predefined message. In some embodiments of the invention, upon failure to communicate with module 160, hub 110 may attempt to upload module 160 to a site and may further attempt to restart module 160.

According to some embodiments of the invention, module 160 may further communicate with various applications and/or systems within the site in which module 160 is installed. For example, a module 160 that may be installed in sites 120, 130, 140 or 150 may be configured to communicate with an enterprise resource planning (ERP) system, a customer relationship management (CRM) system, a database or other systems within a site. Module 160 may further store or record information pertaining to a transaction received from hub 110 or communicated to hub 110. For example, upon receiving a transaction containing a purchase order, module 160 may record and/or store the purchase order in a CRM system. Module 160 may be configured to store some or all of the content of a transaction received as well as information regarding the transaction. For example, module 160 may record the time a transaction was received.

In some embodiments of the invention, module 160 may further be configured to notify an operator upon receiving a transaction document, where notification may be based on predefined criteria, for example transactions from a predefined list of sources may cause module 160 to notify a predefined list of operators, or send an electronic mail to a predefined recipients list. Module 160 may further be configured to perform predefined actions upon detecting predefined events. For example, receiving an invalid transaction may cause module 160 to alert an operator or to communicate an error message to the sender of the invalid transaction pointing out the error and requesting correction.

According to some embodiments of the invention, hub 110 may be provided with a set of rules, criteria, conditions or definitions to be used for processing transactions. Such information may be preconfigured into hub 110, in which case it may be referred to as preconfigured processing definitions. Such information may be provided by an operator of system 100, in which case it may be referred to as user processing definitions. Hub 110 may use either or both preconfigured processing definitions and user processing definitions in order to validate, convert, transform or otherwise manipulate transactions, transaction documents and/or transaction data. Processing definitions may be stored within hub 110 on a variety of storage media such as but not limited to, hard disk, non volatile memory or any other suitable storage media.

According to some embodiments of the invention, processing definitions may define validation rules. For example, the format and/or location of specific fields in a specific transaction may be defined. For example, a date field may be required to appear in a transaction containing a purchase order. The date field may further be required to be the first field in the document being communicated, and may further be required to be in the form of day:month:year, for example, May 30, 2007 is to be represented as 30:05:07. Such set of definitions, when provided to hub 110, may cause hub 110 to verify that a transaction containing a purchase order conform to the required rules.

According to some embodiments of the invention, processing definitions may define specific fields as mandatory in specific transactions. For example, a processing definition may dictate that a purchase order number field exists in a transaction containing a purchase order. Alternatively, processing definitions may specify specific fields may not appear in specific transactions, for example a processing definition may specify that a price field may not appear in a shipping note transaction.

According to some embodiments of the invention, processing definitions may involve complex calculations and/or computations. In some embodiments of the invention, regular expressions may be used to define processing definitions, for example, using wildcards. For example, a processing definition may specify that a specific field must contain the text "*ar". According to regular expression rules as known in the art, such field may contain any text before the string "ar", for example, car, tar, or star, all of which comply with such rule definition. A processing definition may specify that the value of a specific field be some specified value, in other embodiments of the invention, a processing definition may involve multiple fields, for example, a processing definition may specify that the value stored in a specific field is expected to be the sum of two other fields divided by the value of yet another field. According to some embodiments of the invention, other conditional rules may be defined, for example, a processing definition may specify that if a first specified value is found in a first field, then a second specified value must be found in a second field. In another example, a processing definition may specify that if a list of one or more fields exists in the document, then a specific value in a second field is expected, or that a specific value may not be found. In yet another example, a processing definition may specify that if a list of one or more fields does not exist in the document, then a specific value in a second field is expected, or that a specific value may not be found. Another example may be a rule stating a specific field must appear a specified number of times provided some other fields exist in the document. Generally, any suitable logical relations and/or operations involving fields and/or values stored therein are possible as part of a processing definition.

According to some embodiments of the invention, processing definitions may define incorporation of data from external sources. A processing definition may specify that a specific field will be substituted by a value retrieved from a database, a web server, an enterprise resource planning (ERP) system, a customer relationship management (CRM) system or other sources. A processing definition may specify that information retrieved from such sources be used for calculating and/or deriving the content of a specific field. Examples of information which may be obtained from external sources may be currency exchange rate, prices, local time, shipping rates, weather, inventory or a name of a supervisor on duty. For example, a processing definition may cause hub 110 to retrieve a currency exchange rate from a specified web server, possibly using web services (WS) protocol, calculate an amount according to the exchange rate retrieved and according to a value in a specified field and store the calculated amount in a designated field. Similarly, shipping rates which may be unknown by the source of a transaction may be obtained by hub 110, and embodied in a transaction communicated to a recipient, tax rates may be obtained and/or calculated by hub 110, or amount of items to be shipped in a shipping order may be adjusted according to inventory information retrieved by hub 110. In some embodiments of the invention, a processing definition may comprise web services description language (WSDL) declarations. WSDL may be used in order to specify services that may be used in order to obtain data required.

According to some embodiments of the invention, processing definitions may define actions to be performed by hub 110 upon detecting an error, for example, wrong format of a specific field, or a mandatory field missing in a received transaction. A processing definition may define methods by which hub 110 may attempt to correct errors. For example, processing definitions may designate an alternative field which may be used to substitute a missing mandatory field. Alternatively, a processing definition may specify that should an error be detected, a correction will be suggested to a receiver of a transaction rather than a making the correction.

According to some embodiments of the invention, processing definitions may further define transformation of specific fields or data in a transaction. For example, the format of a date or time field may be changed according to a processing definition, for example, a date format of day:month:year received in a transaction may be changed according to a processing definition to month:day:year. Another example may be catalog numbers; for example, a specific item may have different catalog numbers assigned to it by two different organizations. A processing definition may specify that a specific catalog number in specific transactions will be converted to a different catalog number. Such conversions and/or transformations enable organizations communicating through hub 110 to maintain their own catalog numbers, document formats, and/or any other internal representations while corresponding with other organizations that may have their own, different, respective representations.

According to some embodiments of the invention, processing definitions may be contained in a document. Hub 110 may be provided with a document containing processing definitions for each site that corresponds through hub 110. Designated users or administrators may be provided with a software tool that may enable them to modify processing definitions in a document associated with their site, for example, alter, modify, add or delete processing definitions according to changes which may take place in their respective sites. For example a new product may be added to the list of products that may appear in purchase orders, or the price of a product may change or ways for correcting invalid transactions may be added. A graphical user interface (GUI) tool may be provided to users of system 100, such tool may enable users to easily define rules for processing documents which may be communicated between a site and hub 100. The GUI tool may enable users to assign conversion rules, validation rules or other manipulations required to specific fields within specific documents. For example, a user may define that an inventory will be checked in order to validate that the quantity of items required, for example, in a purchase order, can be supplied, or a user may define a web site from which exchange rates are to be retrieved when currency conversions are required.

According to some embodiments of the invention, preconfigured processing definitions and user processing definitions may be stored in extensible stylesheet language transformation (XSLT) documents. An XSLT document may contain instructions for converting documents formatted according to XML into other documents, for example, into documents formatted according to hypertext markup language (HTML), or into plain text documents. XSLT may transform an XML document into another XML document, possibly altering the content, format, and/or other aspects or attributes of the original XML document. XSLT may be particularly suitable for the functions which may be performed by hub 110. XSLT enables complex manipulations of XML document fields, dependencies may be defined that involve values and/or existence of multiple fields, conversions and formatting functions are supported by XSLT as well as execution of functions that may be provided by a user, a third party, or an operating system.

According to some embodiments of the invention, hub 110 may convert received transactions into a uniform internal representation, process the transaction in the internal representation form and may further convert the internal representation to an external representation based on the recipient's preference, and then communicate the resultant information to its destination. Conversion into an internal representation of a transaction may be done according to the source of the received transaction, possibly according to a processing definitions document associated with the source of the transaction. Converting incoming transactions into an internal representation may allow hub 110 to uniformly process transactions and may further simplify processing. For example, two different customers may specify the quantities of a given item in a purchase order differently, for example, one vendor may specify the quantity by hundreds while the other may specify the quantity of the same item by thousands. Hub 110 may be required to query an inventory system as part of the processing of the purchase order, converting the quantities of the given item to a uniform representation, for example units, or dozens, may enable hub 110 to execute the same query function for both vendors. Time difference may be another calculation which may be simplified by first converting time fields in transactions to a common time zone.

According to some embodiments of the invention, hub 110 may comprise business process management utilities such as, for example, a state machine, a scheduler, a periodic actions manager or a routing manager. A business process manager may manage, supervise, monitor or otherwise handle complex business processes. For example, a site communicating through hub 110 may communicate a transaction in parts, e.g. a document may be fragmented, and fragments may be sent separately, possibly with varying time differences between fragments. Since the processing of a transaction may require the entire transaction to be available, a state machine in hub 110 may track progress of the received transaction, assemble fragments as they arrive, and may further be able to determine when the complete transaction has been received, possibly further invoking processing of the transaction. Another business management example may be a periodic action manager which may periodically query an inventory for the availability of a specific item, upon determining adequate quantities of the item are available the periodic action manager may notify interested sites. A routing manager may enable routing of specific transactions to specific sites, or routing of transactions to multiple sites, for example for logging purposes. A scheduler manager may enable delayed actions to be performed, for example, a time constraint may be imposed on a specific transaction, for example, a response is expected with in a certain period of time, if such response fails to arrive within the predefined period of time, a scheduler manager may invoke some action, for example, notify a preconfigured list of sites, users or supervisors.

According to some embodiments of the invention, a transaction may be constructed according to a predefined format. For example, in some embodiments of the invention, a transaction may be constructed according to extensible markup language (XML), which allows for easy representation of practically any data type, as well as definition of hierarchies of data types, and data type definitions. For example, transactions communicated between hub 110 and sites 120, 130, 140 and 150 may be formatted according to XML.

Figure 2:
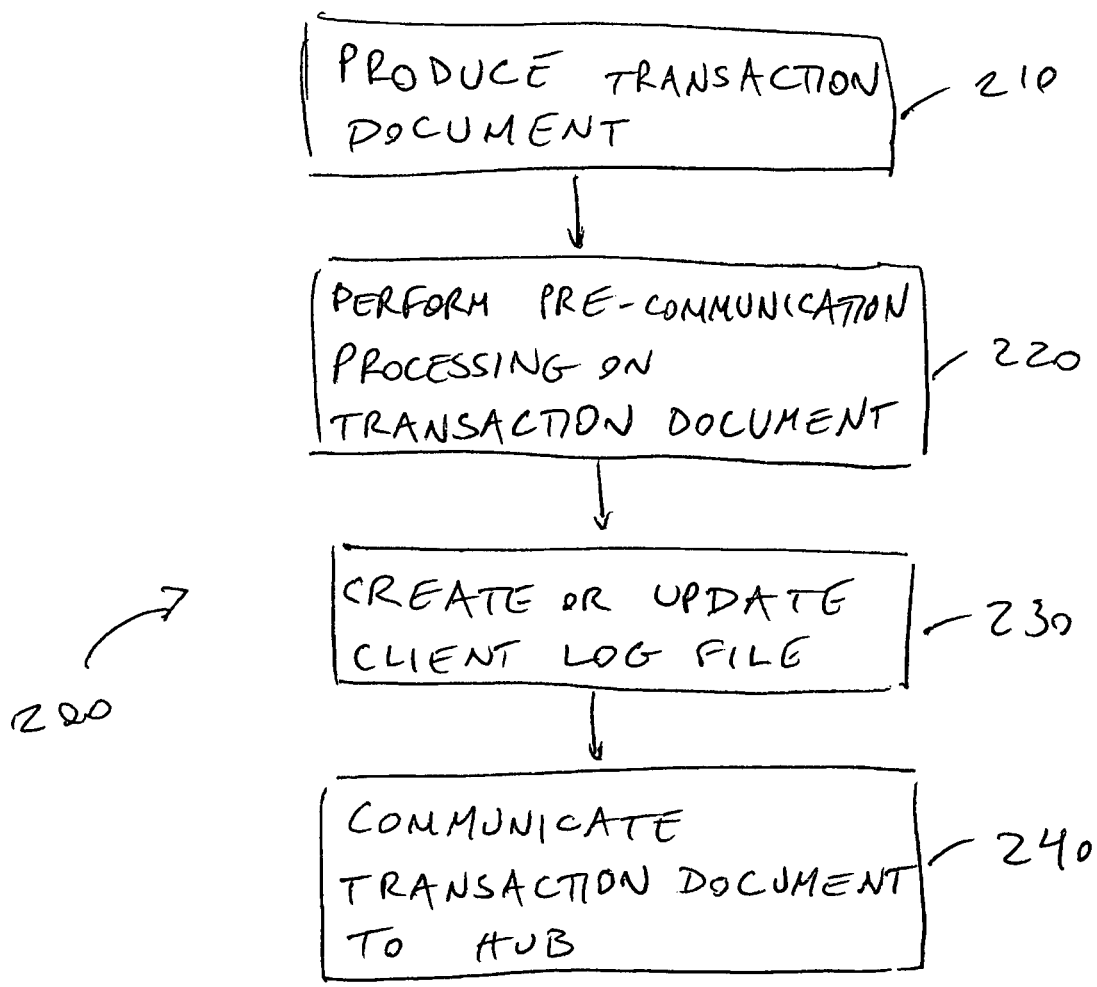
FIG. 2 shows a flowchart according to some embodiments of the invention.

Reference is now made to FIG. 2 showing an exemplary flow 200 of a transaction at a peripheral site according to embodiments of the invention. A document may be produced (210), for example by an application in an organization. For example a supply-chain related document such as a shipping note, invoice, inventory status or purchase order may be produced by an application such as an ERP system a CRM system or the document may be compiled manually. The document may be produced according to some internal, possibly proprietary, format or representation. Prior to being communicated, the document may be processed (220), for example by module 160. Processing may comprise removing information from the document. For example, an ERP system may incorporate confidential information in a document, such confidential information may be removed at 220. Processing of the document may further comprise transforming the document into an XML format representation.

According to some embodiments of the invention, further processing at 220 may comprise encapsulating the XML document into a transaction frame. A transaction frame may comprise the XML document, and predefined header and/or trailer. A transaction header may comprise fields such as a site identification code or number, a transaction identification code, and/or a length field, a transaction trailer may comprise fields such as an error detection/correction field, for example cyclic redundancy check (CRC), and/or padding for alignment purposes. Processing at 220 may further comprise encrypting the transaction, for example, communication may be performed over a secured socket layer (SSL) connection, in which case encryption may be performed according to SSL specifications and/or negotiated parameters. Logging may be performed during processing 220. At 230 a log and/or log file, possibly containing logs collected during processing 220 may be created. In case of need, for example, errors above a predefined severity occurred during processing 220, an alert may be issued and/or the log file may be produced or sent to a predefined list of user and/or applications as well as stored in a predefined location. The transaction may be communicated at 240, for example to hub 110 over communication medium 170.

Figure 3:
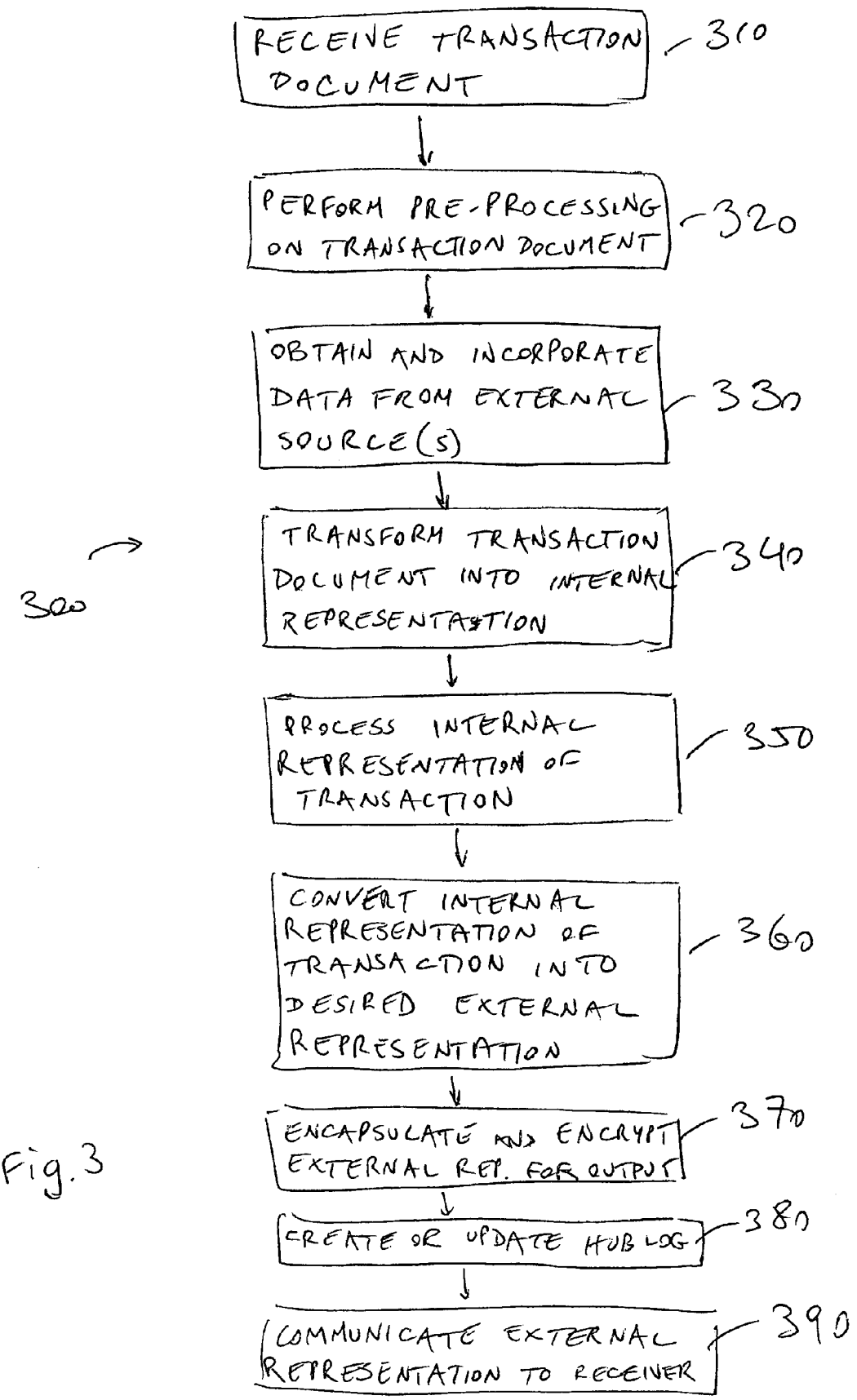

Reference is now made to FIG. 3 showing an exemplary flow 300 of a transaction at the hub according to embodiments of the invention. At 310 the transaction may be received, for example by hub 110. The transaction, which may be encrypted, may be decrypted at 320, for example according to SSL parameters. At 320, the transaction validity may be verified and header and trailer may be removed. Data that may be needed to be added to the transaction may be obtained at 330. As described earlier, this may be done by communicating with applications such as databases, web sites, ERP systems etc. After data required has been obtained and incorporated into the transaction, the transaction may be transformed into an internal representation 340, possibly according to a processing definitions document associated with the source of the transaction. Processing of the transaction in its internal representation may be done at 350. Processing may be done according to a processing definitions document associated with the source of the transaction as well as according to a processing definitions document associated with the destination of the transaction. Processing may involve transformation, validation and other manipulations of the document as described earlier. For example, field formats may be verified and/or converted at this stage, existence of mandatory fields may be ascertained, quantities may be checked against inventories, and format of documents contained in the transaction may be verified. Correction of errors may be done and/or suggested during processing 350. Prior to communicating the resultant information, the resultant information may be converted from its internal representation to an external representation at 360. Conversion of the information from its internal representation to an external representation may be performed according to a processing definition document associated with the destination of the transaction. As described earlier, this processing definition document may have been provided by a recipient user and may represent processing required by the destination site.

According to some embodiments of the invention, further processing at 370 may comprise encapsulating the resulting information into a transaction frame. A transaction frame may comprise header and trailer fields as described by processing 220. The frame may also be encrypted at 370, for example according to SSL parameters and may further be communicated to its destination.

Logs may be collected during processing as well as during reception or communication of transactions. At block 380, a log file may be created or updated. The log file may contain information gathered in any or all of blocks 310 to 370. The log file may be stored and/or may be communicated to either the source of the transaction, destination of the transaction or both. Details contained in a log produced may depend on configuration. For example, a user at site 120 may require that each transaction from site 120 will be logged while a user at site 130 may require that a log file be created only in case an error occurs during a transaction involving site 130, the user at site 130 may further require that in case of error the log file created will be communicated to a list of electronic mail recipients.

According to some embodiments of the invention, the log file may comprise details pertaining to the communication 390 of a transaction to the destination. Communication may be done, for example, over facilities such as communication medium 170. The communicated transaction may be received at a site, for example a site 150 connected to hub 110. At the receiving site, a transaction received may be decrypted, for example, if the transaction was encrypted for security reasons. Frame headers and trailers may need to be removed from the transaction as well. Additional processing at a receiving site may be a validation of the received transaction, for example, verifying that the destination of the transaction is indeed the receiving site. Other validations may comprise ascertaining mandatory fields exist within the transaction or that the format of specific fields complies with a predefined format. At a receiving site the transaction may also be converted into a predefined format. For example, the transaction received may be formatted according to XML, accordingly, an XML document received at a site may be converted into another, suitable format. For example a format suitable for presenting the transaction to a user for verification and possibly for confirmation. The transaction may further be logged at the receiving site. For example, a record may be created, recording details such as but not limited to time the transaction was received, source of transaction and the like. Logging and/or saving information pertaining to a received transaction may be done in accordance with applications at the receiving site. For example, an ERP system may be updated. A CRM system may be another example of a system that may be communicated with and/or updated, as well as any other, suitable database or application used by the receiving site. A log file may be created, such log may be stored and/or communicated, for example, if errors above a predefined severity occurred, the log file may be sent to a predefined list of mail recipients.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for converting a first transaction document to a second transaction document comprising:
   receiving from a first user a first transaction document having a first format;
   converting said first transaction document into an intermediate document having a unified internal format, said conversion being based at least in part on a first set of rules associated with said first user, wherein converting said first transaction document into said intermediate document comprises retrieving for inclusion in said intermediate document data from a source other than said first document;
   selecting based on data obtained from said intermediate document a second user, said second user being an intended recipient of said first transaction document;
   validating data in said intermediate document based at least in part on validation rules associated with said second user, wherein said validating comprises correcting errors in said intermediate document based on said validation rules associated with said second user;
   converting data in said intermediate document into a second transaction document having a second format based on rules associated with said second user; and
   sending said second transaction document to said second user.

2. A method for converting a first transaction document to a second transaction document comprising:
   receiving from a first user a first transaction document having a first format;
   converting said first transaction document into an intermediate document having a unified internal format, said conversion being based at least in part on a first set of rules associated with said first user, wherein converting said first transaction document into said intermediate document comprises retrieving for inclusion in said intermediate document data from a source other than said first document, wherein said retrieving data for inclusion in said intermediate document comprises executing web-services;
   selecting based on data obtained from said intermediate document a second user, said second user being an intended recipient of said first transaction document;
   validating data in said intermediate document based at least in part on validation rules associated with said second user;
   converting data in said intermediate document into a second transaction document having a second format based on rules associated with said second user; and
   sending said second transaction document to said second user.

* * * * *